United States Patent
Murgia et al.

(10) Patent No.: US 11,349,751 B2
(45) Date of Patent: *May 31, 2022

(54) METHOD FOR PRIORITIZATION OF INTERNET TRAFFIC BY FINDING APPROPRIATE INTERNET EXIT POINTS

(71) Applicant: Citrix Systems, Inc., Fort Lauderdale, FL (US)

(72) Inventors: Marco Murgia, Los Gatos, CA (US); Praveen Raja Dhanabalan, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 93 days.

This patent is subject to a terminal disclaimer.

(21) Appl. No.: 16/696,014

(22) Filed: Nov. 26, 2019

(65) Prior Publication Data

US 2020/0099612 A1 Mar. 26, 2020

Related U.S. Application Data (63) Continuation of application No. 15/875,437, filed on Jan. 19, 2018, now Pat. No. 10,516,601.

(51) Int. Cl.
*H04L 45/302* (2022.01)
*H04L 45/00* (2022.01)
(Continued)

(52) U.S. Cl.
CPC ......... *H04L 45/302* (2013.01); *H04L 45/121* (2013.01); *H04L 45/125* (2013.01);
(Continued)

(58) Field of Classification Search
None
See application file for complete search history.

(56) References Cited

U.S. PATENT DOCUMENTS 8,423,631 B1 4/2013 Mower et al.
10,516,601 B2 * 12/2019 Murgia ................. H04L 45/125
(Continued)

OTHER PUBLICATIONS

International Search Report and Written Opinion for PCT Application No. PCT/US2019/012825, dated Mar. 29, 2019.
(Continued)

*Primary Examiner* — Lonnie V Sweet
(74) *Attorney, Agent, or Firm* — Foley & Lardner LLP (57) ABSTRACT

The systems and methods discussed herein provide for faster communications, particularly for high priority traffic, across a distributed network with multiple exit points to a Wide Area Network. Rather than simply routing traffic based on internal or external destination, an intelligent router may measure latency to an endpoint destination via multiple paths, both external and internal, and direct traffic accordingly. Steering high priority traffic via the internal connection to an exit point near the destination server, and then to the server via the external network, may be faster than simply forwarding the connection via the external network from the exit point closest to the source device. Additionally, to reduce bandwidth requirements of the nearby exit point and provide capability for higher priority traffic, low priority traffic may be redirected back via the internal connection and transmitted via a distant exit point.

18 Claims, 5 Drawing Sheets

(51) Int. Cl.
- *H04L 49/20* (2022.01)
- *H04L 45/121* (2022.01)
- *H04L 45/125* (2022.01)
- *H04L 45/12* (2022.01)
- *H04L 47/24* (2022.01)
- *H04L 47/283* (2022.01)
- *H04L 47/125* (2022.01)

(52) U.S. Cl.
CPC .......... *H04L 45/126* (2013.01); *H04L 45/22* (2013.01); *H04L 45/70* (2013.01); *H04L 47/24* (2013.01); *H04L 47/283* (2013.01); *H04L 49/205* (2013.01); *H04L 47/125* (2013.01)

(56) References Cited

U.S. PATENT DOCUMENTS

| | | | |
|---|---|---|---|
| 2004/0213221 A1 | 10/2004 | Civanlar et al. | |
| 2005/0267985 A1 | 12/2005 | Ji et al. | |
| 2006/0123479 A1* | 6/2006 | Kumar | H04L 63/0245 726/23 |
| 2008/0077705 A1* | 3/2008 | Li | H04L 69/22 709/236 |
| 2011/0032833 A1* | 2/2011 | Zhang | H04L 45/70 370/252 |
| 2011/0044173 A1 | 2/2011 | Kakadia et al. | |
| 2011/0063979 A1 | 3/2011 | Matthews et al. | |
| 2012/0075999 A1 | 3/2012 | Ko et al. | |
| 2012/0275309 A1* | 11/2012 | Jalil | H04L 45/124 370/238 |
| 2013/0322255 A1* | 12/2013 | Dillon | H04L 43/0888 370/236 |
| 2014/0180499 A1 | 6/2014 | Cooper et al. | |
| 2015/0055468 A1 | 2/2015 | Agarwal et al. | |
| 2015/0163179 A1 | 6/2015 | Maes et al. | |
| 2015/0326439 A1* | 11/2015 | Smith | H04L 45/122 370/254 |
| 2016/0330108 A1* | 11/2016 | Gillon | H04L 45/28 |
| 2016/0337223 A1* | 11/2016 | Mackay | H04L 43/16 |
| 2017/0155590 A1* | 6/2017 | Dillon | H04L 41/5025 |
| 2019/0208445 A1 | 7/2019 | Klatsky et al. | |

OTHER PUBLICATIONS

Non-Final Office Action for U.S. Appl. No. 15/875,437, dated Mar. 21, 2019.

Notice of Allowance for U.S. Appl. No. 15/875,437, dated Aug. 27, 2019.

International Preliminary Report on Patentability on PCT Appl. No. PCT/US2019/012825, dated Jul. 30, 2020.

* cited by examiner

METHOD FOR PRIORITIZATION OF INTERNET TRAFFIC BY FINDING APPROPRIATE INTERNET EXIT POINTS

CROSS-REFERENCE TO RELATED APPLICATION

This patent application is a continuation of, and claims priority to and the benefit of, U.S. patent application Ser. No. 15/875,437, titled "METHOD FOR PRIORITIZATION OF INTERNET TRAFFIC BY FINDING APPROPRIATE INTERNET EXIT POINTS," and filed Jan. 19, 2018, the contents all of which are hereby incorporated herein by reference in its entirety for all purposes.

FIELD OF THE DISCLOSURE

The present application generally relates to data transmission over a network and routing traffic via one of a plurality of potential paths.

BACKGROUND OF THE DISCLOSURE

Many companies and enterprises have geographically distributed offices, including headquarters, branch or satellite offices, as well as staff working remotely from home or on the road. Computing devices at these remote locations may be connected both to internal networks (e.g. between sites, such as via virtual private network (VPN) connections), as well as to external networks (e.g. wide area networks (WANs), such as the Internet) via "exit points" from the internal networks. Simple traffic routing policies, such as routing internal traffic via internal VPN connections and external traffic via external WAN connections may be inefficient and slow in many implementations.

BRIEF SUMMARY OF THE DISCLOSURE

The systems and methods discussed herein provide for faster communications, particularly for high priority traffic, across a distributed network with multiple exit points to a Wide Area Network. Rather than simply routing traffic based on internal or external destination, an intelligent router may measure latency to an endpoint destination via multiple paths, both external and internal, and direct traffic accordingly. For example, in many implementations, high speed connections between geographically distributed branch offices may be faster paths for communications to nearby servers that are on the external network. Steering high priority traffic via the internal connection to an exit point near the destination server, and then to the server via the external network, may be faster than simply forwarding the connection via the external network from the exit point closest to the source device. Additionally, to reduce bandwidth requirements of the nearby exit point and provide capability for higher priority traffic, low priority traffic may be redirected back via the internal connection and transmitted via a distant exit point.

In one aspect, the present disclosure is directed to a system for routing traffic via a plurality of network interfaces. The system includes a routing device comprising a plurality of network interfaces, a connection monitor, and a traffic router. A first network interface of the plurality of network interfaces is connected via a first network to a client device. A second network interface of the plurality of network interfaces is connected via a second network to a remote server. A third network interface of the plurality of network interfaces is connected via a third network to a remote routing device, the remote routing device in communication with the remote server via a fourth network. The connection monitor is configured to measure a first connection latency to the remote server via the second network, and a second connection latency to the remote server via the third network, the remote routing device, and the fourth network. The traffic router is configured to, responsive to the measured first connection latency and the second connection latency, either redirect a packet received from the client device via the first network to the second network, or redirect the packet received from the client device via the first network to the third network, the remote routing device, and the fourth network.

In some implementations, the third network comprises a virtual private network. In some implementations, the remote routing device is geographically closer to the remote server than the routing device. In some implementations, the second network and the fourth network are the same network. In some implementations, the first connection latency exceeds the second connection latency, and the traffic router is configured to redirect the packet via the third network, the remote routing device configured to forward the packet to the remote server via the fourth network. In some implementations, the connection monitor is further configured to monitor total utilization of the second network and fourth network and utilization of the second network and fourth network by high priority traffic. In a further implementation, the traffic router is configured to redirect high priority traffic to the remote server from the first network via the third network, responsive to the first connection latency exceeding the second connection latency; and redirect low priority traffic received from the remote routing device via the third network to the second network, responsive to the utilization of the fourth network by high priority traffic exceeding a predetermined percentage of the total utilization of the fourth network.

In another aspect, the present disclosure is directed to a method for routing traffic via a plurality of network interfaces. The method includes measuring, by a connection monitor of a routing device in communication with a client device via a first network, a first connection latency to a remote server via a second network, and a second connection latency to the remote server via a third network and a remote routing device in communication with the remote server via a fourth network. The method also includes, responsive to the measured first connection latency and the second connection latency redirecting, by a traffic router of the routing device, a packet received from the client device via the first network via either (i) the second network, or (ii) the third network, the remote routing device, and the fourth network.

In some implementations of the method, the third network comprises a virtual private network. In some implementations of the method, the remote routing device is geographically closer to the remote server than the routing device. In some implementations of the method, the second network and the fourth network are the same network. In some implementations, the first connection latency exceeds the second connection latency, and the method includes redirecting, by the traffic router, the packet via the third network, the remote routing device configured to forward the packet to the remote server via the fourth network. In some implementations, the method includes monitoring, by the connection monitor, total utilization of the second network and fourth network and utilization of the second network and fourth network by high priority traffic. In a further implementation, the method includes redirecting, by the traffic router, high priority traffic to the remote server from the first network via the third network, responsive to the first connection latency exceeding the second connection latency; and redirecting, by the traffic router, low priority traffic received from the remote routing device via the third network to the second network, responsive to the utilization of the fourth network by high priority traffic exceeding a predetermined percentage of the total utilization of the fourth network.

In another aspect, the present disclosure is directed to a system for routing traffic via a plurality of network interfaces. The system includes a routing device comprising a plurality of network interfaces and a traffic router. A first network interface is connected via a first network to a server. A second network interface is connected via a second network to a remote routing device, the remote routing device in communication with a remote client device. A third network interface is connected via a third network to a local client device. The traffic router is configured to redirect a packet from the remote client device, received via the second network from the remote routing device, to the server via the first network. The traffic router is also configured to redirect a packet from the local client device to the server via the second network and the remote routing device, the remote routing device forwarding the packet from the local client device to the server via a fourth network.

In some implementations, the second network comprises a virtual private network. In some implementations, the routing device is geographically closer to the server than the remote routing device. In some implementations, the first network and the fourth network are the same network. In some implementations, the packet from the remote client device is identified as a high priority packet. In a further implementation, the packet from the local client device is identified as a low priority packet.

BRIEF DESCRIPTION OF THE FIGURES

The foregoing and other objects, aspects, features, and advantages of the present solution will become more apparent and better understood by referring to the following description taken in conjunction with the accompanying drawings, in which.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Many companies and enterprises have geographically distributed offices, including headquarters, branch or satellite offices, as well as staff working remotely from home or on the road. Computing devices at these remote locations may be connected both to internal networks (e.g. between sites, such as via virtual private network (VPN) connections), as well as to external networks (e.g. wide area networks (WANs), such as the Internet) via "exit points" from the internal networks. As used herein, "exit points" refers to gateways that provide connections between internal networks (including distributed networks via VPN connections) and external networks (e.g. the Internet).

Simple traffic routing policies, such as routing internal traffic via internal VPN connections and external traffic via external WAN connections may be inefficient and slow in many implementations. External traffic may be both high and low priority, based on business needs. For example, traffic to a cloud-provided online work application (such as an office productivity suite) may be of higher priority to the enterprise or company than traffic to a social media site. Simply steering traffic based on it being directed to an external site would classify this traffic similarly, despite having different requirements. Similarly, both sets of traffic may utilize the same higher level protocols (e.g. HTTPS), and thus not be easily distinguished by the router without deep packet inspection, which adds additional processing overhead.

Traditionally, scheduling high priority traffic over low priority traffic allows prioritization of traffic. However, with a distributed network, geographic placement may contribute significantly to latency and scheduling traffic based on priority may not be the most efficient solution. In such scenarios, providing provide network level prioritization for such traffic—for example, sending high priority productivity traffic via a low latency path, and low priority social media traffic via a high latency path—may be particularly valuable to the geographically distributed enterprise.

For example, it may be common in typical implementations to send Internet (external) traffic from each branch office directly via a local gateway. However, the gateway may not be the closest gateway to the traffic's eventual destination. In other implementations, Internet traffic may be sent to a data center or central location and then forwarded via a gateway to the Internet. This provides consistent service for each branch location, at the expense of speed and significant resource requirements at the data center. In still other implementations, some software-as-a-service (SaaS) traffic may be sent from local gateways, via static routing policies. However, as the Internet is dynamic, such solutions may not be able to adjust to changing network conditions or latencies.

Instead, to manage traffic across geographically separated sites, WAN virtualization devices or routing device may be deployed and connected through multiple links. These devices may prioritize traffic such that the best path is used by the highest priority traffic. Given the control and visibility of traffic across different sites, the routing devices can provide efficient and balanced steering of traffic via multiple exit points.

The systems and methods discussed herein provide for faster communications, particularly for high priority traffic, across a distributed network with multiple exit points to a Wide Area Network. Rather than simply routing traffic based on internal or external destination, an intelligent router may measure latency to an endpoint destination via multiple paths, both external and internal, and direct traffic accordingly. For example, in many implementations, high speed connections between geographically distributed branch offices may be faster paths for communications to nearby servers that are on the external network. Steering high priority traffic via the internal connection to an exit point near the destination server, and then to the server via the external network, may be faster than simply forwarding the connection via the external network from the exit point closest to the source device. Additionally, to reduce bandwidth requirements of the nearby exit point and provide capability for higher priority traffic, low priority traffic may be redirected back via the internal connection and transmitted via a distant exit point.

Figure 1A:
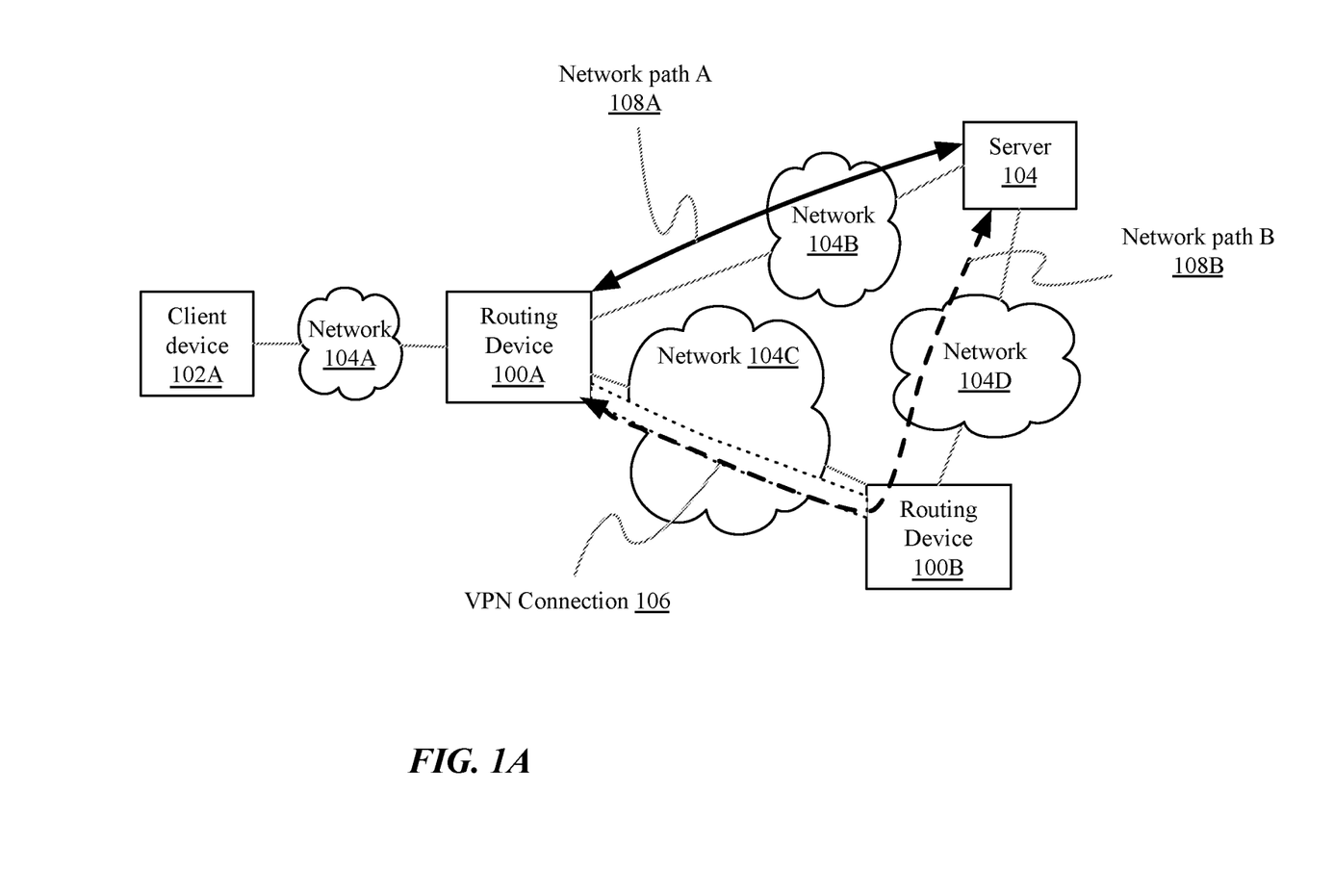
FIG. 1A is a block diagram illustrating an implementation of a network environment for use with the systems and methods discussed herein.

FIG. 1A is a block diagram illustrating an implementation of a network environment for use with the systems and methods discussed herein. As shown, a plurality of routing devices 100A-100B (referred to generally as routing device(s) 100) may connect via a plurality of networks 104A-104D (referred to generally as network(s) 104). Routing devices 100 may comprise any type and form of computing device, including gateways, switches, routers, hubs, firewalls, access points, network address translators (NATs), load balancers, network accelerators, WAN virtualizers, or other such devices for routing traffic between endpoints. Routing devices 100 may be physical devices, such as appliances, rackmount servers, desktop servers, workstations, embedded devices, or other such devices. In other implementations, routing devices 100 may be virtual devices executed by physical devices, such as virtual machines or virtual appliances. In many implementations, routing devices 100 may each comprise a plurality of devices, such as a cluster of appliances, server farm, cloud, or other such deployment.

Networks 104 may comprise one or more networks of the same or different types, including standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, satellite connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In many implementations, a network 104 may comprise a plurality of networks and intermediary devices (e.g. switches, routers, firewalls, gateways, modems, or other devices not illustrated). Networks 104A-104D may be homogenous or heterogeneous. For example, in many implementations, network 104A may comprise a local area network or LAN at a branch office. Routing device 100A may act as a gateway for the branch office or LAN 104A to connect to external networks 104B, 104C. Although shown separately, in many implementations, external networks 104B, 104C may be the same network, e.g. the Internet.

A client device 102A (referred to generally as client device(s) 102 or device(s) 102) may be deployed at one location, such as a first branch location, corporate headquarters, data center, user's home, etc. Client devices 102 may comprise any type and form of computing device, including laptop computers, desktop computers, portable computers, wearable computers, tablet computers, embedded systems, virtual machines, physical machines, IoT devices or "smart" appliances, monitoring devices, measurement devices, or any other such type and form of devices. The client device 102A may communicate with a server 104 (or another computing device, such as a second client device 102, in some implementations). Server 104 may comprise any type and form of computing device, including a server device, workstation device, rackmount device, appliance, cluster, server farm, virtual machine executed by a physical machine, or any other such device.

Routing device 100A may establish a virtual private network connection 106 with a second routing device 100B at a geographically remote location, such as at another branch location, corporate headquarters, data center, user's home, etc. VPN connection 106 may be over an external network such as network 104C, which again, may be the same network as network 104B (e.g. the Internet). Routing device 100B may similarly connect to a network 104D, which may also be the same network as networks 104B, 104C (e.g. the Internet). Accordingly, given the geographically distributed routing devices 100A, 100B and different external and internal (and VPN) connections, there may be multiple potential paths between the client device 102A and server 104, e.g. network path A 108A and network path B 108B, referred to generally as network path(s) 108 or end-to-end path(s) 108.

A simple topology-based routing system may view network path A 108A as shorter, as it only traverses the external network once, while path B 108B traverses the VPN connection 106 over network 104C in addition to external network 104D. However, in many implementations, VPN connection 106 may be a high bandwidth, low latency connection between the geographically remote routing devices 100A, 100B. For example, many enterprises may utilize high bandwidth point-to-point connections (e.g. point-to-point fiber-optic connections or leased lines, etc.). Additionally, routing devices 100A, 100B or other devices such as network accelerators or WAN virtualization appliances may provide for higher speed connections between the two devices (e.g. via additional compression, caching, transport layer pooling or multiplexing, or other such network acceleration techniques that utilize coordination between pairs of devices). Accordingly, the segment of path B 108B via VPN connection 106 may be very low latency. If routing device 100B is geographically close to server 104 (or connected via similar high-speed, low latency links), then the total latency of path B 108B may significantly shorter than that of path A 108A, despite the additional "hop".

Figure 1B:
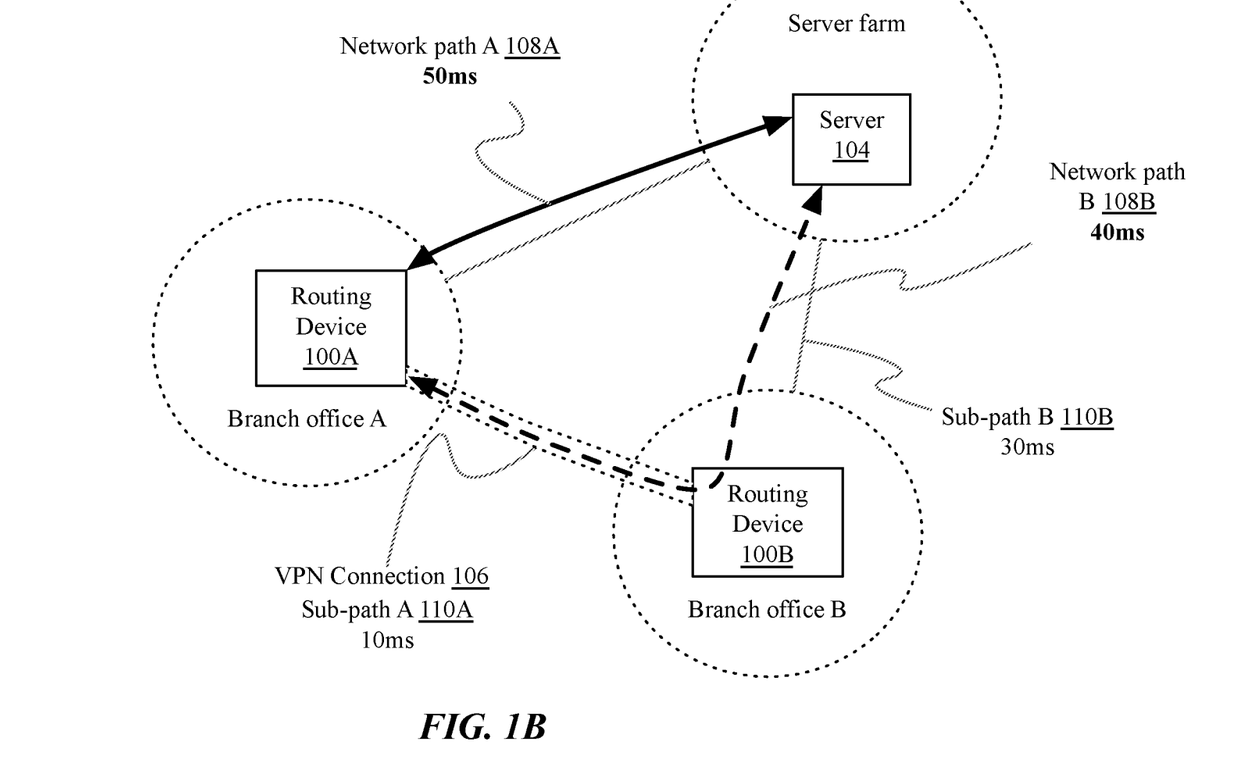
FIG. 1B is a simplified block diagram of the implementation of FIG. 1A.

For example, FIG. 1B is a simplified block diagram of the implementation of FIG. 1A. Routing device 100A may be at a first location (e.g. branch office A, in Florida), and routing device 100B may be at a second location (e.g. branch office B, in Los Angeles). Server 104 may be at a third location, geographically proximate to the second location (e.g. a server farm in San Diego). The network path 108A from the first location to the third location via the Internet may have a first latency, such as 50 ms. However, the network path 108B from the first location via the second location to the third location may have a lower total latency, such as 40 ms, as a result of a significantly faster inter-routing device connection or segment (e.g. sub-path 110A, with a latency of 10 ms) and a slower but geographically close segment to the server (e.g. sub-path 110B, with a latency of 30 ms).

Additionally, with multiple distributed sites and additional routing devices 100, servers 104 in remote locations may be close to one or more of the distributed sites and routing devices 100. Accordingly, by measuring paths from a client device to a server both via local exit points to external networks and via internal connections to other routing devices and then to the server via corresponding exit points of the routing devices, high priority traffic may be steered via the fastest and most efficient paths. As the servers may have different domains, hostnames, and IP addresses, deep packet inspection and machine learning may be utilized to identify traffic and corresponding paths. Destination IP addresses may be cached and categorized according to application and shared with other routing devices within the system. Latency to the addresses may be identified (e.g. via ping tests or other measurements) as well as other characteristics (e.g. bandwidth, jitter, packet loss rates, etc.). Each router may share metrics for communications to the destination with other routers.

For example, given a particular destination server, each router may identify metrics to reach the destination from its local exit points, as shown in the table below:

| Rank | Site location | Latency to destination | Max Load to destination |
|---|---|---|---|
| 1 | Santa Clara | 10 ms | 10 Mbps |
| 2 | Raleigh | 35 ms | 15 Mbps |
| 3 | London | 40 ms | 10 Mbps |
| 4 | Bangalore | 45 ms | 20 Mbps |
| etc. | | | |

Similar tables may be generated for other destination servers.

For high priority traffic, based on the destination IP of any new flow or session between a client device and the server, the system may identify the most efficient route, whether it is via a local exit point or a VPN connection to another router and to the server via the other router's exit point.

For example, assuming path latency on the sub-segment between branch sites Raleigh and Santa Clara is 20 ms, then to access the destination server from the Raleigh location, the best path would be from the Raleigh site via the inter-router sub-path to the Santa Clara site, and then to the server, with 20 ms for the inter-site sub-path and 10 ms for the Santa Clara to destination sub-path, totaling 30 ms. This would be a lower latency connection compared to directly accessing the server from Raleigh, at 35 ms.

However, it may not be sufficient to merely monitor latency. As noted in the table above, each site may have a maximum load capability of its external network connection or exit point. Other traffic from the site (e.g. Santa Clara) would be in competition with the high priority traffic sent to the site router for forwarding via the exit point to the destination. In order to avoid overwhelming traffic to that exit point, the system may dynamically adapt loads to deprioritize low priority traffic from that site. This may be achieved by periodically monitoring the load of low priority and high priority Internet traffic, and routing low priority traffic through other sites when utilization exceeds a threshold.

Figure 1C:
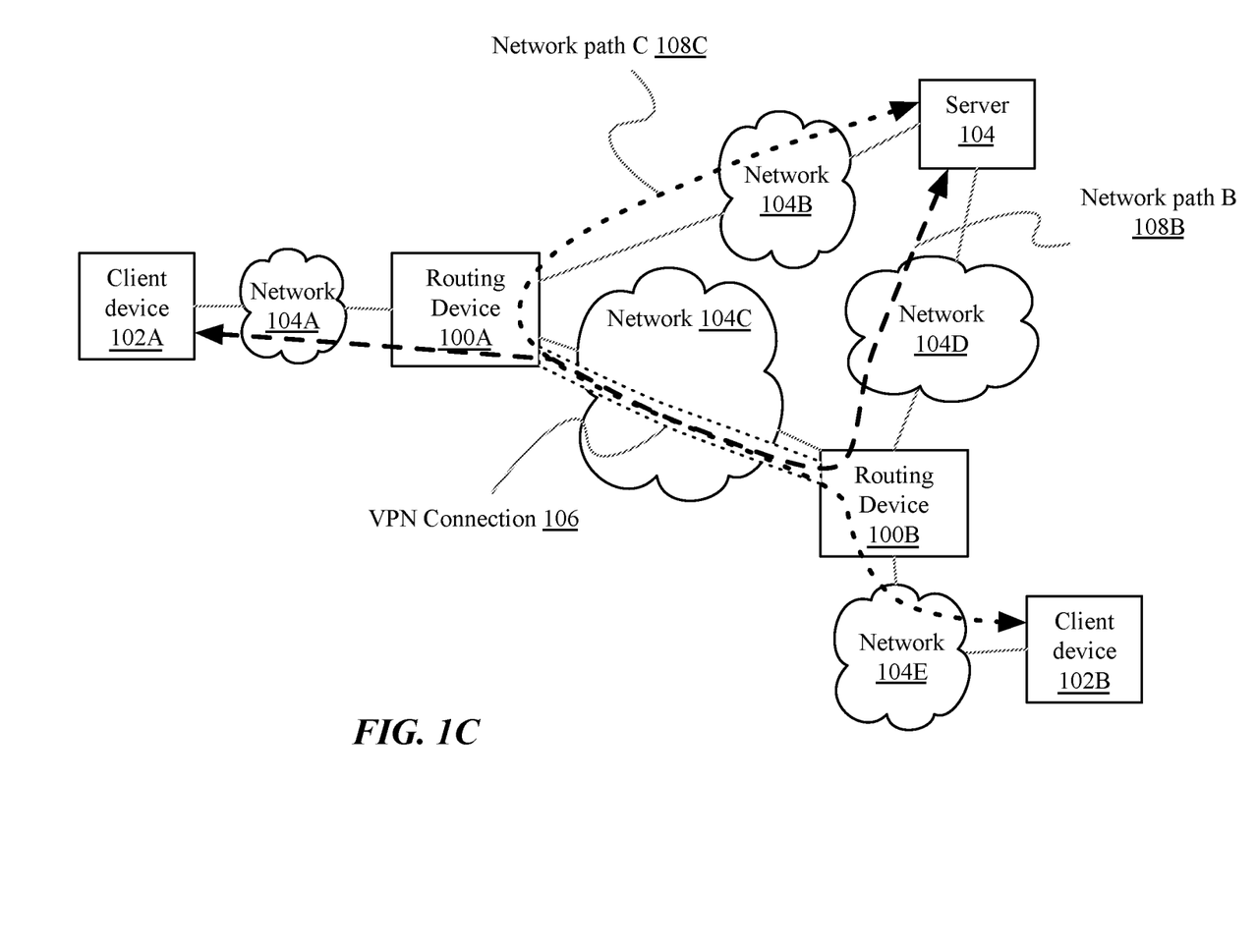
FIG. 1C is a block diagram of another implementation of the network environment of FIG. 1A.

For example, FIG. 1C is a block diagram of another implementation of the network environment of FIG. 1A, with a second client device 102B deployed on a network 104E (e.g. a LAN at a branch office) connected to routing device 100B. As in the example of FIGS. 1A and 1B, client device 102A may establish a communication session with server 104 via network path B 108B via VPN connection 106 and external network 104D, as this may be lower latency than the path via network 104B. If client device 102B also wishes to establish a communication session with server 104, its lowest latency path may also be via network 104D. However, if client device 102B's session is lower priority (e.g. social media traffic, email, or other lower priority traffic) than client device 102A's session (e.g. productivity suite traffic, voice over IP (VoIP), video chat, remote desktop, etc.), the system may determine whether the exit point to network 104D from routing device 100B is over utilized or being utilized beyond a threshold level. If so, the low priority traffic from client device 102B may be redirected back via VPN connection 106 to routing device 100A, and then forwarded to server 104 via network 104B (i.e. along network path C 108C). While this may add significant latency to this path (which will be even longer than path A 108A of FIG. 1), it may still be sufficient for low priority traffic.

Thus, the system may monitor the load on each site or utilization of network exit points over predetermined periods of time, such as ten seconds, one minute, five minutes, or any other such period. Average utilization over the time period may be compared to the maximum utilization, e.g. as a percentage or static amount. A threshold (similarly, a percentage or static amount, in various implementations) may be compared with the average utilization, and if traffic exceeds the threshold, then low priority traffic may be steered via the backhaul or VPN connection to another site for forwarding via a less-utilized exit point. For example, the table provided above may be expanded as shown below:

| Rank | Site location | Latency to destination | Max Load to destination | Average high priority load for last hour |
|---|---|---|---|---|
| 1 | Santa Clara | 10 ms | 10 Mbps | 4 Mbps |
| 2 | Raleigh | 35 ms | 15 Mbps | 6 Mbps |
| 3 | London | 40 ms | 10 Mbps | 3 Mbps |
| 4 | Bangalore | 45 ms | 20 Mbps | 5 Mpbs |
| etc. | | | | |

In one implementation, the system may reserve a predetermined portion of the exit point bandwidth from the lowest latency site for high priority traffic (e.g. reserving 4 Mbps for high priority traffic from the Santa Clara site to the destination). If the traffic exceeds this reserved portion (e.g. over 4 Mbps), then additional high priority traffic may be steered to the second-best site (e.g. Raleigh, at 35 ms). In a subsequent time period, the reserved share for the first site may be increased (e.g. to 5 Mbps, 6 Mbps, or any other suitable amount). Additionally, low priority traffic to the destination server from the Santa Clara site may be redirected to another site (e.g. Bangalore, which has higher latency, but significant additional load available).

Figure 2A:
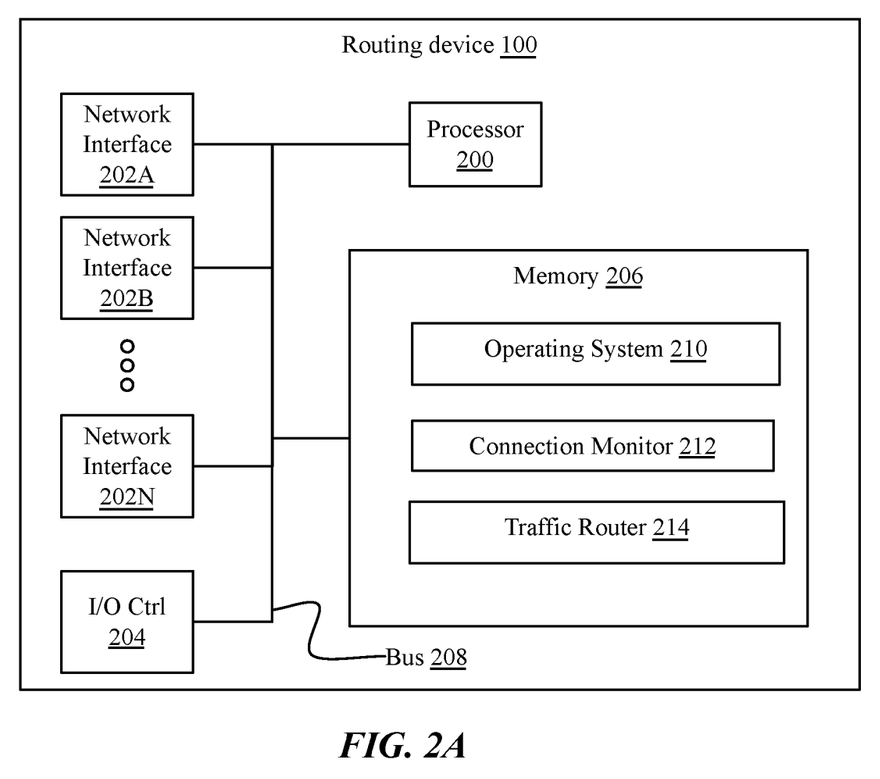
FIG. 2A is a block diagram of an embodiment of a routing device.

FIG. 2A is a block diagram of an embodiment of a routing device 100. As shown in FIG. 2A, a routing device 100, sometimes referred to as a computing device, router, accelerator, load balancer, WAN virtualizer, gateway, or by any other such terms, may include one or more central processing units or processors 200, one or more network interfaces 202, one or more input/output controllers or devices 204, one or more memory units 206 which may include system memory such as RAM as well as internal or external storage devices. A computing device may also include other units not illustrated including installation devices, display devices, keyboards, pointing devices such as a mouse, touch screen devices, or other such devices. Memory 206 may include, without limitation, an operating system 210 and/or software.

The central processing unit 200 is any logic circuitry that responds to and processes instructions fetched from the memory 206. In many embodiments, the central processing unit 200 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device may be based on any of these processors, or any other processor capable of operating as described herein.

Memory 206, sometimes referred to as a main memory unit, may be one or more memory chips capable of storing data and allowing any storage location to be directly accessed by the microprocessor 200, such as any type or variant of Static random access memory (SRAM), Dynamic random access memory (DRAM), Ferroelectric RAM (FRAM), NAND Flash, NOR Flash and Solid State Drives (SSD). The memory 206 may be based on any of the above described memory chips, or any other available memory chips capable of operating as described herein. In the embodiment shown, the processor 200 communicates with main memory 206 via a system bus 208 (described in more detail below). In other embodiments, the processor communicates directly with main memory 206 via a memory port. For example, in such embodiments, the memory 206 may be DRDRAM. In other embodiments, processor 200 may communicate directly with cache memory via a secondary bus, sometimes referred to as a backside bus. In other embodiments, the main processor 200 communicates with cache memory using the system bus 208. Cache memory typically has a faster response time than memory accessible via a system bus, and is provided by, for example, SRAM, BSRAM, or EDRAM.

In some embodiments, the processor 200 communicates with various I/O devices 204 via local system bus 208. Various buses may be used to connect the central processing unit 200 to any I/O devices, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display, the processor 200 may use an Advanced Graphics Port (AGP) to communicate with the display. In some embodiments, the processor 200 may communicate directly with I/O devices, for example via HYPERTRANSPORT, RAPIDIO, or INFINIBAND communications technology. A wide variety of I/O devices may be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 204 as shown in FIG. 2A. The I/O controller may control one or more I/O devices such as a keyboard and a pointing device, e.g., a mouse or optical pen. Furthermore, an I/O device may also provide storage and/or an installation medium for the computing device. In still other embodiments, the computing device may provide USB connections (not shown) to receive handheld USB storage devices such as the USB Flash Drive line of devices manufactured by Twintech Industry, Inc. of Los Alamitos, Calif.

The computing device may support any suitable installation device (not illustrated), such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device may further include a storage device, such as one or more hard disk drives or redundant arrays of independent disks, for storing an operating system and other related software, and for storing application software programs such as any program or software for implementing (e.g., configured and/or designed for) the systems and methods described herein. Optionally, any of the installation devices could also be used as the storage device. Additionally, the operating system and the software can be run from a bootable medium.

Furthermore, the computing device may include one or more network interfaces 202A-202N (referred to generally as network interface(s) 202) to interface to a network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device communicates with other computing devices via any type and/or form of gateway or tunneling protocol such as Secure Socket Layer (SSL) or Transport Layer Security (TLS). The network interface 202 may include a built-in network adapter, network interface card, PCMCIA network card, card bus network adapter, wireless network adapter, USB network adapter, modem or any other device suitable for interfacing the computing device to any type of network capable of communication and performing the operations described herein.

In some embodiments, the computing device may include or be connected to one or more display devices. As such, any I/O devices and/or the I/O controller 204 may include any type and/or form of suitable hardware, software, or combination of hardware and software to support, enable or provide for the connection and use of the display device(s) by the computing device. For example, the computing device may include any type and/or form of video adapter, video card, driver, and/or library to interface, communicate, connect or otherwise use the display device(s). In one embodiment, a video adapter may include multiple connectors to interface to the display device(s). In other embodiments, the computing device may include multiple video adapters, with each video adapter connected to the display device(s). In some embodiments, any portion of the operating system 210 of the computing device may be configured for using multiple displays. One ordinarily skilled in the art will recognize and appreciate the various ways and embodiments that a computing device may be configured to have one or more display devices.

In further embodiments, an I/O device may be a bridge between the system bus 208 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a Fibre-Channel bus, a Serial Attached small computer system interface bus, a USB connection, or a HDMI bus.

A routing device 100 of the sort depicted in FIG. 2A may operate under the control of an operating system 210, which controls scheduling of tasks and access to system resources. The routing device can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the routing device and performing the operations described herein. Typical operating systems include, but are not limited to: Android, produced by Google Inc.; WINDOWS 7, 8, or 10, produced by Microsoft Corporation of Redmond, Wash.; MAC OS and iOS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

As discussed above, the routing device can be any workstation, server, appliance, virtual machine, desktop computer, rackmount computer, laptop or notebook computer, handheld computer, mobile telephone or other portable telecommunications device, media playing device, a gaming system, mobile computing device, or any other type and/or form of computing, telecommunications or media device that is capable of communication. The computer system has sufficient processor power and memory capacity to perform the operations described herein.

In some embodiments, the computing device may have different processors, operating systems, and input devices consistent with the device. For example, in one embodiment, the computing device is a smart phone, mobile device, tablet or personal digital assistant. In still other embodiments, the computing device is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Routing device 100 may comprise a connection monitor 212 and a traffic router 214. Although shown as part of memory 206, in many implementations, connection monitor 212 and/or traffic router 214 may be provided by a network interface 202. For example, a packet processing engine executed by a co-processor of a network interface may perform connection monitoring and/or traffic routing. In many implementations, connection monitor 212 and/or traffic router 214 may be embodied in circuitry, such as application-specific integrated circuits (ASICs), for higher processing speed.

Connection monitor 212 may comprise hardware, software, or a combination of hardware and software for monitoring status and characteristics of one or more network connections or paths. Connection monitor 212 may monitor a network connection, e.g. to a server and/or client device, for latency, bandwidth, utilization, jitter, loss rates, congestion, or any other type and form of characteristic. Connection monitor 212 may determine average utilization over a predetermined time period, such as an average transmission rate in Mbps over a period, such as a minute or an hour.

Traffic router 214 may comprise hardware, software, or a combination of hardware and software for receiving and forwarding packets of a flow between end-point devices (e.g. client devices, servers, etc.). Traffic router 214 may perform network address translation or rewriting of source and/or destination addresses or ports, or other modifications to packets at any level, including the data link layer, network layer, transport layer, or higher layers of the OSI model. In many implementations, traffic router 214 may reroute packets between network and transport layer endpoints via different link layer paths. For example, as discussed above, a traffic router may select between different links to transmit packets between a client and server based on priority of the packets or flow, utilization, latency, and/or any other characteristics, including selecting longer (e.g. more hops, physically longer, etc.) paths for lower latencies or higher efficiencies.

Figure 2B:
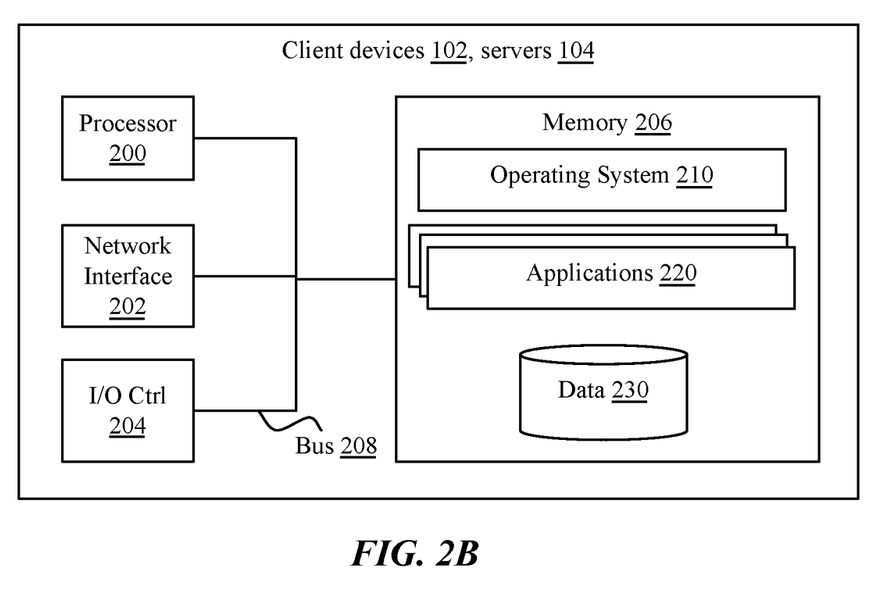
FIG. 2B is a block diagram of an embodiment of computing device.

FIG. 2B is a block diagram of an embodiment of computing device, such as client devices 102 and/or servers 104, as well as other computing devices including client computing devices, server computing devices, workstation devices, cloud computing devices, or any other type and form of computing device, referred to generally herein as a "computing device" or "computing devices". Such devices may include laptop computers, desktop computers, rackmount computers, tablet computers, wearable computers, appliances, cluster devices or appliances, server clouds or farms, virtual machines executed by one or more physical machines, or any other type of computing device.

Client devices 102 and/or servers 104 may include many of the components discussed above, including one or more processors 200, network interfaces 202, I/O controllers 204, memory devices 206, and an operating system 210. Client devices 102 and/or servers 104 may execute one or more applications 220, such as web browsers, media players, video games, productivity software, VoIP software, video chat software, or any other type and form of applications 220. Client devices 102 and/or servers 104 may also include data stores 230, which may be of any type and form, including libraries, databases, data files, flat files, logs, configuration files, installation files, archives, images, videos, audio, or any other type and form of data, including executable instructions or non-executable data.

Figure 3:
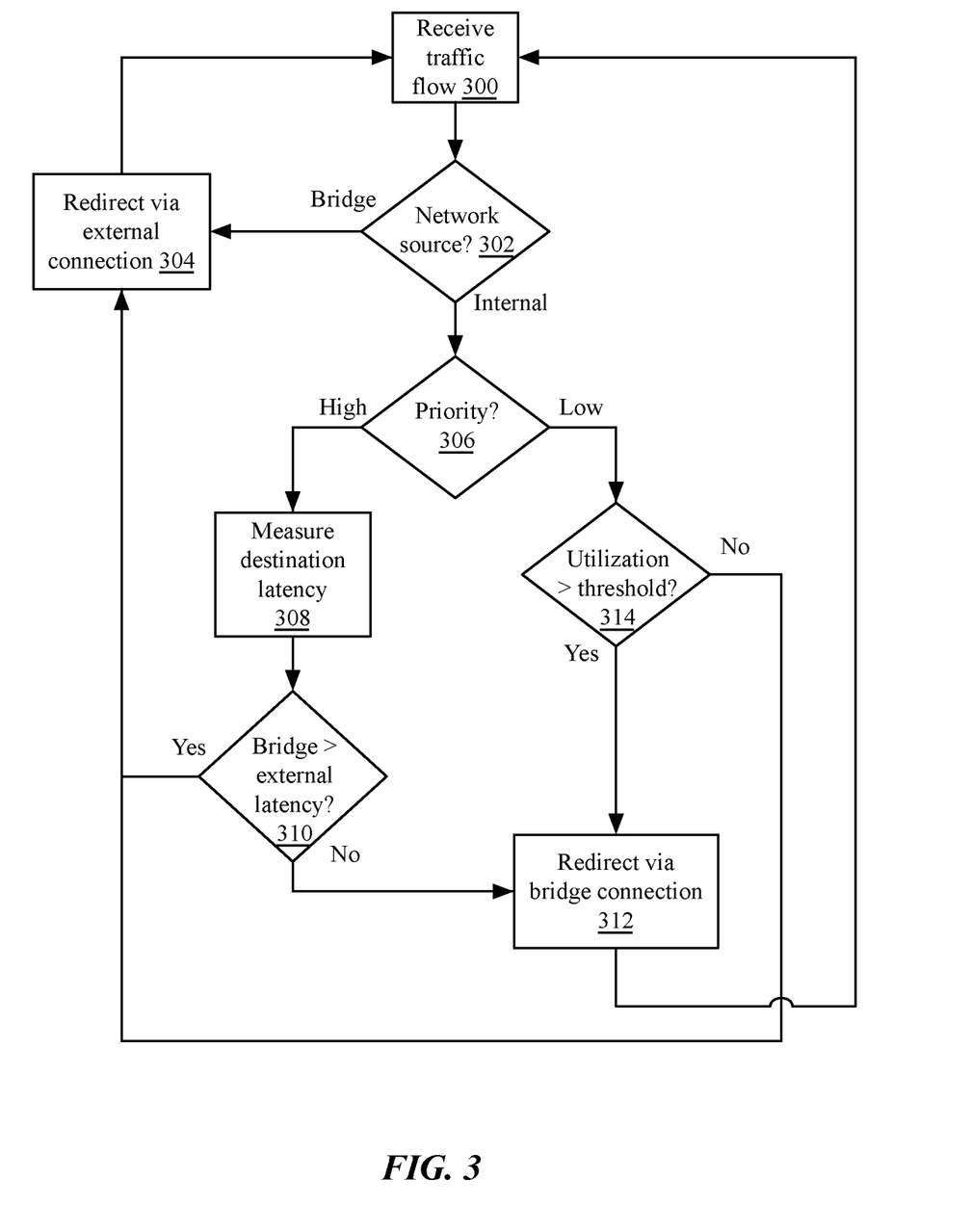
FIG. 3 is a flowchart of an embodiment of a method for routing traffic via distributed exit points.

FIG. 3 is a flowchart of an embodiment of a method for routing traffic via distributed exit points. At step 300, a routing device may receive packets of a traffic flow directed to a destination server. The packets may be any type and form, including requests, responses, handshaking packets (e.g. SYN packets), etc., and may be in any protocol, including HTTP, FTP, SMTP, SIP, or any other such application or session layer protocols; TCP, UDP, or any other transport layer protocols; and IPv4, IPv6, or any other network layer protocols. The packets may be exchanged over any type of physical layer connection.

At step 302, in some implementations, the routing device may determine whether the packet source is from an internal network or an external network. In some implementations, as discussed above, the routing device may be deployed between a first internal network or LAN and a second external network or WAN, and may communicate via a VPN or bridge with a second routing device. In some such implementations, the routing device may be configured to automatically forward packets directed to an external server received via the VPN connection or bridge from another routing device to an external connection. Such packets may be forwarded by the other routing device for retransmission via the external connection of the routing device, and accordingly may be quickly forwarded without further examination or processing, to reduce latency. In some implementations, this may be done automatically for any packet received via the bridge or VPN connection that is directed to a destination address that is not on an internal network. In other implementations, this may be done responsive to a flag or predetermined bit set in the header of the packet by the router indicating that the packet should be redirected via the external connection. For any such packets, at step 304, the routing device may retransmit the packet via an external network connection.

If the network source of the packet is from an internal network for which the router is deployed as a gateway or intermediary, then in some implementations, at step 306, the router may determine whether the packet is high or low priority. The router may determine the priority based on an application or session layer protocol of the packet, a destination address or port of the packet, a domain identified in the packet, a size of the packet or payload of the packet, or any other such information. Priority may be a dichotomy (e.g. "high" vs. "low") or may have multiple levels (e.g. "level 1", "level 2", "level 3", etc.). Thus, in many implementations, "high" priority may refer to communication flows needing relatively lower latency than "low" priority flows, rather than a specific value.

If the packet is high priority, then in some implementations, at step 308, the routing device may measure a latency of a path to a destination. In some implementations, measuring the latency may comprise transmitting a ping or similar request and measuring a round trip time to the destination. Although shown after step 306, in many implementations, the routing device may measure latency to the destination periodically (e.g. every minute, every ten minutes, every hour, etc.). As discussed above, in many implementations, the routing device may identify frequently accessed servers, addresses, domains, etc., for high priority traffic, and may periodically measure round trip latency to such frequently accessed destinations.

Measuring the latency 308 may also include determining a total latency of a path via one or more other routing devices, as discussed above. In many implementations, the routing device may calculate the latency via information received from such other devices. For example, not only may a first routing device measure round trip latency to frequency accessed destinations, each other routing device may also measure round trip latency to the destinations via external network connections of those devices. The routing devices may periodically exchange tables identifying their measured latency to each destination, for use in calculating a total latency of a path. Furthermore, each routing device may also measure latency of sub-path connections to each other routing device (e.g. when exchanging measurement tables, in many implementations). Accordingly, in addition to measuring latency to a server via its own external connection, the routing device may also calculate latency to the server via other routing devices as a sum of the bridge or VPN connection to such other device and its reported external connection latency to the server.

At step 310, if the latency to the server via the external connection is lower than the calculated or measured latency via the bridge connection to another router and via that router's external connection to the server, then the router may transmit the packet via its external connection at step 304. Otherwise, at step 312, the router may forward the packet via the bridge connection to the other router. As discussed above, in many implementations, the router may select one of a plurality of other routers to forward the packet based on total latency to the server via each of the plurality of other routers. Thus, in some implementations, step 310 may be performed in serial or parallel for each of a plurality of paths to the server via each of a plurality of other routers, with a lowest-latency path selected for bridging the packet at step 312. As discussed above, in many implementations, the router may mark or tag the packet (e.g. via a flag or predetermined bit or other identifier) such that the recipient router knows to forward the packet to the server at step 302.

As discussed above, in some implementations, low priority packets or flows may be similarly redirected via a bridge connection to reduce utilization of an external network connection. In such implementations, if the routing device determines that the flow is low priority at step 306, then at step 314, the routing device may determine if an average utilization of its external connection has exceeded a threshold. The routing device may monitor the connection utilization over a time period (e.g. 1 minute, 10 minutes, 1 hour, etc.) and may record an average utilization of the connection. If the average exceeds a predetermined threshold (e.g. percentage of a maximum bandwidth of the connection, or a set value), the routing device may redirect the low priority packet or flow via the bridge connection at step 312. In some implementations, the routing device may select a highest latency path to the server from among a plurality of paths. In other implementations, the routing device may select another router that has a low utilization of its external connection. In some implementations, as part of periodic measurements of latency of the bridge connections and/or exchange of latency measurement tables, the routing devices may also report average utilization and/or maximum bandwidth of their external connections, or bandwidth available for low priority flows over a subsequent timer period. In still other implementations, the routing device may select another routing device to which to bridge the flow, responsive to the other routing device providing a high priority flow to the first routing device for redirection via its external connection. This may reduce necessary data exchange between the routing devices while still providing reasonable "fairness". If the utilization of the external connection is less than the threshold, then the flow may be transmitted via the external connection at step 304.

In many implementations, the method may be performed for a first packet of a flow (e.g. a first packet establishing the communication session, a first packet including a substantive payload after a handshaking procedure, a packet comprising a request, etc.). The routing device may cache the selected path (e.g. via the external connection or bridge to another router), and may automatically use the same path for subsequent packets of the same flow. The routing device may clear the path selection from the cache when the flow is complete, in some implementations. In other implementations, in case the flow is quickly reestablished, the device may wait a predetermined period of time before clearing the patch from the cache (e.g. 1 minute, 10 minutes, 1 hour, 1 day, etc.).

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/ or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method comprising:
    establishing, by a device comprising a plurality of network interfaces, a first connection to a server on an external network via a first network interface of the plurality of network interfaces, and a bridge connection to one or more routing devices on an internal network via a second network interface of the plurality of network interfaces, providing a path to the server via the external network;
    redirecting, by the device, one or more packets with a low priority to the server via the bridge connection responsive to determining that a utilization of the first connection over a period of time is greater than a predetermined threshold;
    identifying, by the device, that a source of a packet destined to the server is from the internal network and a priority of the packet is at least higher than the low priority;
    determining, by the device responsive to the priority of the packet and identifying that the source of the packet is from the internal network, a first latency via the first connection to the server is lower than a second latency of the path to the server via the bridge connection; and
    forwarding, by the device responsive to the determination, the packet to the server via the first connection.

2. The method of claim 1, wherein the device is deployed between the internal network and the external network.

3. The method of claim 1, wherein the one or more routing devices on the internal network provide a different exit point to the external network than an exit point of the first connection to the server.

4. The method of claim 1, further comprising measuring, by the device, one of the first latency or the second latency at least on a periodic basis.

5. The method of claim 1, further comprising determining, by the device, the second latency based at least on information received from the one or more routing devices.

6. The method of claim 1, further comprising determining, by the device, to forward one or more subsequent packets via the first connection based at least on a utilization of the first connection being less than a predetermined threshold.

7. A system comprising:
    a device comprising one or more processors and a plurality of network interfaces, coupled to memory and configured to:
    establish a first connection to a server on an external network via a first network interface of the plurality of network interfaces, and a bridge connection to one or more routing devices on an internal network via a second network interface of the plurality of network interfaces, providing a path to the server via the external network;

redirect one or more packets with a low priority to the server via the bridge connection responsive to determining that a utilization of the first connection over a period of time is greater than a predetermined threshold;

identify that a source of a packet destined to the server is from the internal network and a priority of the packet is at least higher than the low priority;

determine, responsive to the priority of the packet and identifying that the source of the packet is from the internal network, a first latency via the first connection to the server is lower than a second latency of the path to the server via the bridge connection; and forward, responsive to the determination, the packet to the server via the first connection.

8. The system of claim 7, wherein the device is deployed between the internal network and the external network.

9. The system of claim 7, wherein the one or more routing devices on the internal network provide a different exit point to the external network than an exit point of the first connection to the server.

10. The system of claim 7, wherein one of the first latency or the second latency at least on a periodic basis.

11. The system of claim 7, wherein the device is further configured to determine the second latency based at least on information received from the one or more routing devices.

12. The system of claim 7, wherein the device is further configured to determine to forward one or more subsequent packets via the first connection based at least on a utilization of the first connection being less than a predetermined threshold.

13. A non-transitory computer readable medium storing program instructions for causing one or more processors to:

establish a first connection to a server on an external network via a first network interface of a plurality of network interfaces of a device, and a bridge connection to one or more routing devices on an internal network via a second network interface of the plurality of network interfaces, providing a path to the server via the external network;

redirect one or more packets with a low priority to the server via the bridge connection responsive to determining that a utilization of the first connection over a period of time is greater than a predetermined threshold;

identify that a source of a packet destined to the server is from the internal network and a priority of the packet is at least higher than the low priority, determine, response to the priority of the packet and the identified identifying that the source of the packet is from the internal network, a first latency via the first connection to the server is lower than a second latency of the path to the server via the bridge connection, and forward, responsive to the determination, the packet to the server via the first connection.

14. The non-transitory computer readable medium of claim 13, wherein a device comprising the one or more processors is deployed between the internal network and the external network.

15. The non-transitory computer readable medium of claim 13, wherein the one or more routing devices on the internal network provide a different exit point to the external network than an exit point of the first connection to the server.

16. The non-transitory computer readable medium of claim 13, wherein the program instructions further cause the one or more processors to determine the second latency based at least on information received from the one or more routing devices.

17. The non-transitory computer readable medium of claim 13, wherein the program instructions further cause the one or more processors to determine to forward one or more subsequent packets via the first connection based at least on a utilization of the first connection being less than a predetermined threshold.

18. The non-transitory computer readable medium of claim 13, wherein the program instructions further cause the one or more processors to identify the source of the packet destined to the server according to a flag or predetermined bit in a header of the packet.

* * * * *